United States Patent
Kim et al.

(10) Patent No.: US 9,544,414 B2
(45) Date of Patent: Jan. 10, 2017

(54) MOBILE COMMUNICATION TERMINAL, CONTROL METHOD THEREOF, AUXILIARY TERMINAL AND VEHICLE

(71) Applicant: LG ELECTRONICS INC., Seoul (KR)

(72) Inventors: Mingoo Kim, Seoul (KR); Seungman Kim, Seoul (KR); Kwangjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/849,666

(22) Filed: Sep. 10, 2015

(65) Prior Publication Data

US 2016/0127529 A1    May 5, 2016

(30) Foreign Application Priority Data

Nov. 3, 2014  (KR) ......................... 10-2014-0151330

(51) Int. Cl.
| | |
|---|---|
| *H04W 4/00* | (2009.01) |
| *H04M 1/725* | (2006.01) |
| *H04L 29/08* | (2006.01) |
| *H04M 1/60* | (2006.01) |

(52) U.S. Cl.
CPC .......... *H04M 1/72527* (2013.01); *H04L 67/12* (2013.01); *H04M 1/6075* (2013.01); *H04M 1/72563* (2013.01); *H04W 4/008* (2013.01); *H04M 2250/02* (2013.01)

(58) Field of Classification Search
CPC ...... H04L 63/1433; H04L 67/12; H04L 67/42; H04L 67/02; H04L 41/0893; H04L 43/04; G02B 5/30; H04W 68/00

USPC .............. 455/418, 556.1; 345/32; 348/14.01; 709/227

See application file for complete search history.

(56) References Cited

U.S. PATENT DOCUMENTS

| | | |
|---|---|---|
| 2013/0013148 A1 | 1/2013 | Park |
| 2013/0138728 A1 | 5/2013 | Kim et al. |
| 2014/0012497 A1 | 1/2014 | Pierfelice |
| 2014/0038669 A1* | 2/2014 | Shimizu ................. H04L 67/12 455/556.1 |
| 2015/0285976 A1* | 10/2015 | Lee .......................... G09G 3/20 345/32 |

FOREIGN PATENT DOCUMENTS

| | | |
|---|---|---|
| KR | 10-2009-0078599 | 7/2009 |
| KR | 10-2010-0062699 | 6/2010 |
| KR | 10-2011-0057930 | 6/2011 |

(Continued)

OTHER PUBLICATIONS

Office Action issued in Korean Application No. 10-2014-0151330 on Nov. 24, 2015, 4 pages.

(Continued)

*Primary Examiner* — Phuoc H Doan
(74) *Attorney, Agent, or Firm* — Fish & Richardson P.C.

(57) ABSTRACT

A mobile communication system provides new services to a mobile terminal mounted in a vehicle through an auxiliary terminal by connecting the auxiliary terminal to the mobile terminal. A mobile communication system includes a first terminal mounted in a vehicle, and a second terminal configured to detect application programs available in the first terminal and transmit an application program list indicating the detected application programs to the first terminal.

23 Claims, 11 Drawing Sheets

(56) References Cited

FOREIGN PATENT DOCUMENTS

| KR | 10-2011-0087111 | 8/2011 |
| KR | 10-2014-0084461 | 7/2014 |
| KR | 10-2014-0098383 | 8/2014 |

OTHER PUBLICATIONS

Extended European Search Report issued in European Application No. 15002493.3 on Mar. 8, 2016, 7 pages.

* cited by examiner

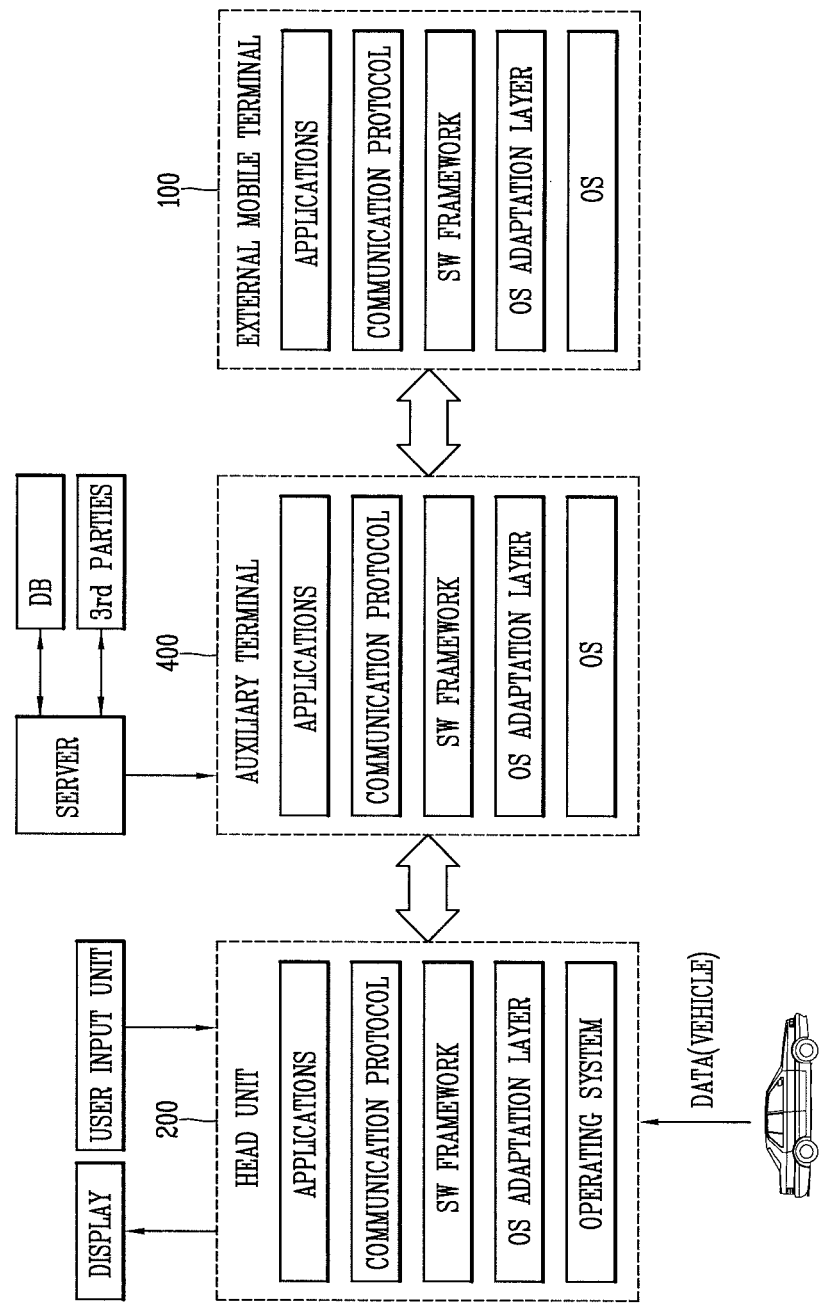

MOBILE COMMUNICATION TERMINAL, CONTROL METHOD THEREOF, AUXILIARY TERMINAL AND VEHICLE

CROSS-REFERENCE TO RELATED APPLICATION

Pursuant to 35 U.S.C. §119(a), this application claims the benefit of earlier filing date and right of priority to Korean Application No. 10-2014-0151330, filed on Nov. 3, 2014, the content of which is incorporated by reference herein in its entirety.

FIELD

This specification relates to a mobile communication system mounted in a vehicle, a control method thereof, an auxiliary terminal, and a vehicle.

BACKGROUND

Terminals may be classified as mobile/portable terminals or stationary terminals according to their mobility. Mobile terminals may be classified as handheld terminals or vehicle mounted terminals according to whether or not a user can directly carry the terminal.

As terminals become multifunctional, mobile terminals may capture still images or moving images, play music or video files, play games, receive broadcast and the like. In this regard, a mobile terminal may serve as an integrated multimedia player.

SUMMARY

In one aspect, a mobile communication system includes a first terminal mounted in a vehicle and a second terminal configured to detect application programs available in the first terminal and transmit, to the first terminal, an application program list indicating the detected application programs. The first terminal is configured to output, on a display unit, the application program list and request the second terminal to execute a first application program included in the application program list. The second terminal is configured to execute the first application program in response to the request, and transmit, to the first terminal, a first execution screen according to an execution result of the first application program.

Implementations may include one or more of the following features. For example, the first terminal may be configured to request the second terminal to execute a specific event within the first execution screen. In this example, the second terminal may be configured to execute the specific event within the first execution screen in response to the request for the execution of the specific event, and transmit, to the first terminal, a second execution screen according to an execution result of the specific event.

In some examples, the second terminal may be configured to detect the application programs available in the first terminal on the basis of attribute information relating to the first terminal. In these examples, the attribute information related to the first terminal may include a screen resolution, a screen size, and an application program list of the first terminal. Also, in these examples, the first application program may be an application program which is not present in the application program list of the first terminal and is available in the first terminal. Further, in these examples, the second terminal may be configured to modify the first and second execution screens to match a screen resolution and a screen size of the first terminal, and transmit, to the first terminal, the modified first and second execution screens.

The second terminal may be configured to detect the application programs available in the first terminal from a memory of the second terminal, a server, or an external mobile terminal. The second terminal also may be configured to selectively transmit, to the first terminal, information received from a server or external mobile terminal. The second terminal further may be configured to classify information received from a server or external mobile terminal according to preset priorities, and transmit the classified information to the first terminal according to the preset priorities.

In some implementations, the second terminal may be configured to periodically detect a resource usage of the first terminal, use resources of the first terminal based on the resource usage of the first terminal exceeding a preset reference, and transmit, to the first terminal, result information in response to the use of the resources. In addition, the first terminal may be configured to periodically detect a resource usage of the second terminal, use resources of the second terminal based on the resource usage of the second terminal exceeding a preset reference, and transmit, to the second terminal, result information in response to the use of the resources.

In some examples, the second terminal may be configured to update an application program of the first terminal by receiving, from a server or an external mobile terminal, data for updating the application program of the first terminal and transmitting, to the first terminal, the received data. The first terminal may be configured to output icons indicating the application programs included in the application program list on a vehicle home screen, and the second terminal may be configured to change a graphic user interface theme corresponding to the vehicle home screen.

In another aspect, an auxiliary terminal includes a controller that is configured to perform communication with a first terminal mounted in a vehicle, detect application programs available in the first terminal on the basis of attribute information related to the first terminal, and transmit, to the first terminal, an application program list indicating the detected application programs. The controller is configured to execute a first application program included in the application program list in response to a request of the first terminal, and transmit, to the first terminal, a first execution screen according to an execution result of the first application program.

In yet another aspect, a method for controlling a mobile communication system includes detecting, by a second terminal performing communication with a first terminal mounted in a vehicle, application programs available in the first terminal and transmitting, to the first terminal, an application program list indicating the detected application programs. The method also includes outputting, by the first terminal and on a display unit of the first terminal, the application program list and requesting the second terminal to execute a first application program included in the application program list. The method further includes executing, by the second terminal, the first application program in response to the request and transmitting, to the first terminal, a first execution screen according to an execution result of the first application program.

Implementations may include one or more of the following features. For example, the method may include requesting, by the first terminal, the second terminal to execute a specific event within the first execution screen. In this example, the method may include executing, by the second terminal, the specific event within the first execution screen in response to the request for the execution of the specific event and transmitting, to the first terminal, a second execution screen according to an execution result of the specific event.

In some implementations, the method may include detecting, by the second terminal, the application programs available in the first terminal on the basis of attribute information relating to the first terminal. In these implementations, the attribute information related to the first terminal may include a screen resolution, a screen size, and an application program list of the first terminal and the first application program may be an application program which is not present in the application program list of the first terminal and is available in the first terminal. Further, in these implementations, the method may include modifying, by the second terminal, the first and second execution screens to match a screen resolution and a screen size of the first terminal and transmitting, to the first terminal, the modified first and second execution screens.

The method may include detecting, by the second terminal, the application programs available in the first terminal from a memory of the second terminal, a server, or an external mobile terminal. The method also may include selectively transmitting, by the second terminal and to the first terminal, information received from a server or external mobile terminal. The method further may include classifying, by the second terminal, information received from a server or external mobile terminal according to preset priorities and transmitting the classified information to the first terminal according to the preset priorities.

In addition, the method may include periodically detecting, by the second terminal, a resource usage of the first terminal, using the resources of the first terminal based on the resource usage of the first terminal exceeding a preset reference, and transmitting, to the first terminal, result information in response to the use of the resources. Also, the method may include periodically detecting, by the first terminal, a resource usage of the second terminal, using the resources of the second terminal based on the resource usage of the second terminal exceeding a preset reference, and transmitting, to the second terminal, result information in response to the use of the resources.

In some examples, the method may include updating, by the second terminal, an application program of the first terminal by receiving, from a server or an external mobile terminal, data for updating the application program of the first terminal, and transmitting, to the first terminal, the received data. And, the method may include outputting, by the first terminal and on a vehicle home screen, icons indicating the application programs included in the application program list, and changing, by the second terminal, a graphic user interface theme corresponding to the vehicle home screen.

Further scope of applicability of the present application will be apparent from the detailed description given hereinafter. However, it should be understood that the detailed description and specific examples are given by way of illustration only. Various changes and modifications within the spirit and scope of the disclosure will be apparent to those skilled in the art from the detailed description.

BRIEF DESCRIPTION OF THE DRAWINGS

FIG. 11 is a view illustrating an example architecture of a mobile communication system.

DETAILED DESCRIPTION

Figure 1:
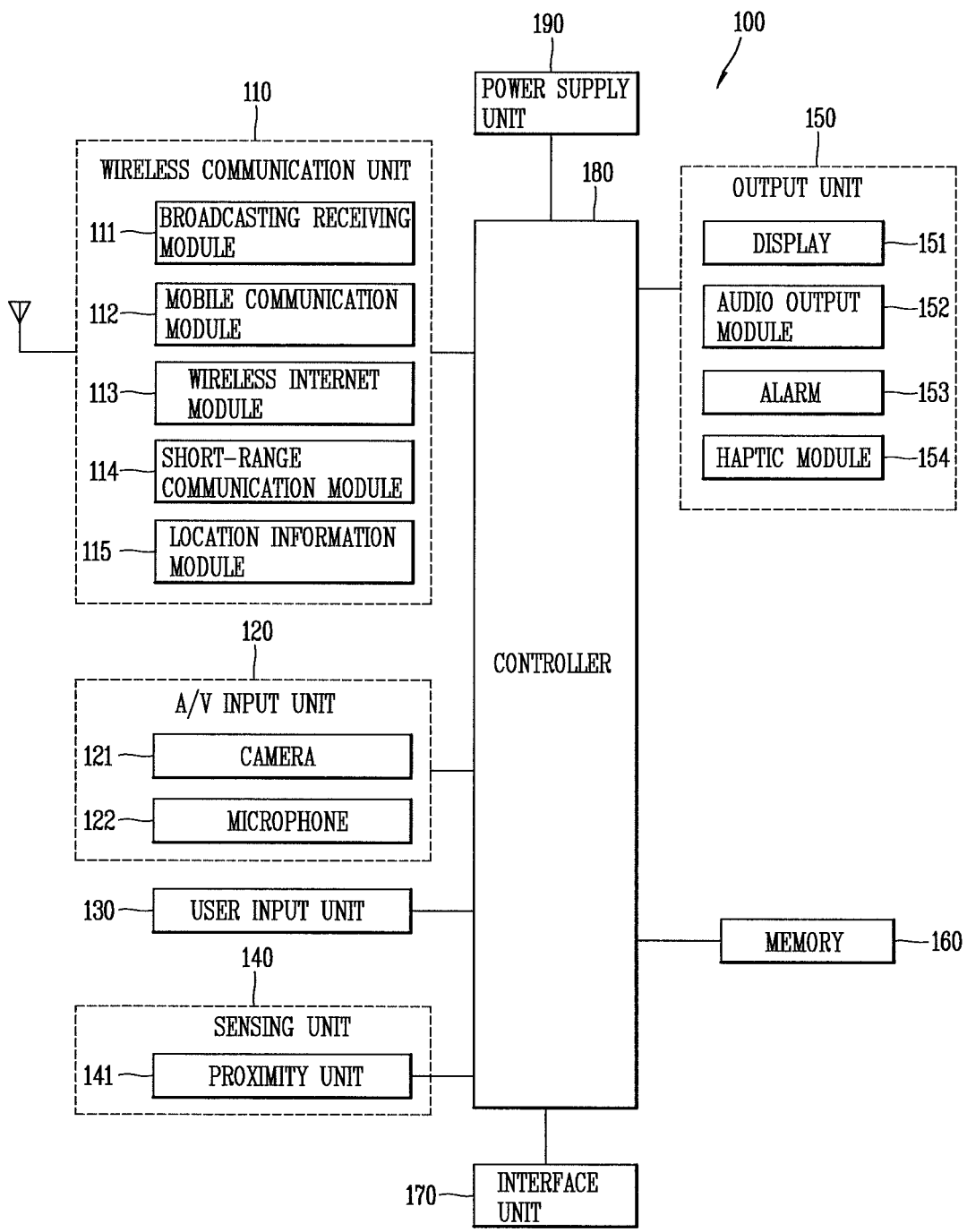
FIG. 1 is a block diagram illustrating an example configuration of a mobile terminal.

FIG. 1 shows an example configuration of a mobile communication terminal 100. The mobile communication terminal (e.g., a cellular phone or a mobile phone) 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. Although FIG. 1 shows the mobile communication terminal 100 having various components, implementing all of the illustrated components is not a requirement. The mobile communication terminal 100 may be implemented by greater or fewer components.

The wireless communication unit 110 includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured for any broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. As the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may use a GPS (Global Positioning System) module that receives location information from a plurality of satellites. The location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) processes to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection device) detects a current status (or state) of the mobile communication terminal 100 such as an opened or closed state of the mobile communication terminal 100, a location of the mobile communication terminal 100, the presence or absence of user contact with the mobile communication terminal 100 (e.g., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection device) serves as an interface by which at least one external device may be connected with the mobile communication terminal 100. For example, the external devices may include wired or wireless headset ports, an external power supply (or battery charger)

ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to also as the 'identifying device') may take the form of a smart card. Accordingly, the identifying device may be connected with the terminal 100 via a port or other connection device. The interface unit 170 may be used to receive inputs (e.g., data, information, power, etc.) from an external device and transfer the received inputs to one or more elements within the mobile communication terminal 100 or may be used to transfer data within the mobile communication terminal to an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging, multimedia file downloading, etc.). When the mobile communication terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile communication terminal 100 may include two or more display units (or other display devices). For example, the mobile terminal may include both an external display unit and an internal display unit.

When the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

A proximity sensor 141 may be disposed within the mobile terminal covered by the touch screen or near the touch screen. The proximity sensor 141 refers to a sensor for detecting the presence or absence of an object or an object that exists nearby by using the force of electromagnetism or infrared rays without a mechanical contact. Thus, the proximity sensor 141 may have a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile communication terminal 100. The audio output module 152 may include a receiver, a speaker, a buzzer, etc.

The alarm unit 153 outputs a signal for informing about an occurrence of an event of the mobile communication terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration device. Or, when a key signal is inputted, the alarm unit 153 may vibrate the mobile communication terminal 100 through a vibration device as a feedback with respect to the key signal input. Through the vibration, the user may recognize the occurrence of an event. A signal for notifying about the occurrence of an event may be output to the display unit 151 or to the voice output module 152.

A haptic module 154 generates various tactile effects the user may feel. An example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile communication terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile communication terminal 100 may be operated in relation to a web storage device that performs the storage function of the memory 160 over the Internet.

The interface unit 170 serves as an interface with an external device connected with the mobile communication terminal 100. For example, the interface unit 170 may transmit data to an external device, receives and transmits power to each element of the mobile communication terminal 100, or transmits internal data of the mobile communication terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various types of information for authenticating the authority of using the mobile communication terminal 100 and may include a user identity module (UIM), a subscriber identity module (SIM) a universal subscriber identity module (USIM), and the like. In addition, the device having the identification module (referred to also as 'identifying device') may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile communication terminal 100 or may be used to transfer data between the mobile terminal and an external device.

When the mobile communication terminal 100 is connected with an external cradle, the interface unit 170 may serve as a passage to allow power from the cradle to be supplied therethrough to the mobile communication terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 may control the operations of the mobile terminal. For example, the controller 180 performs controlling and processing associated with voice calls, data communications, video calls, and the like. The controller 180 may include a multimedia module for reproducing multimedia data. The multimedia module may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various implementations described herein may be implemented in a computer-readable or its similar medium using, for example, software, hardware, or any combination thereof. For hardware implementation, the implementations described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such implementations may be implemented by the controller 180 itself. For software implementations, procedures or functions described herein may be implemented by separate software modules. Each software module may perform one or more functions or operations described herein in conjunction with hardware. Software codes can be implemented by a software application written in any suitable programming language. The software codes may be stored in the memory 160 and executed by the controller 180.

The voice recognition module (voice recognition engine) recognizes a voice pronounced by the user and performs a corresponding function according to the recognized voice signal.

A navigation session applied to the mobile communication terminal 100 displays a route from a point of departure to a destination on map data.

Figure 2:
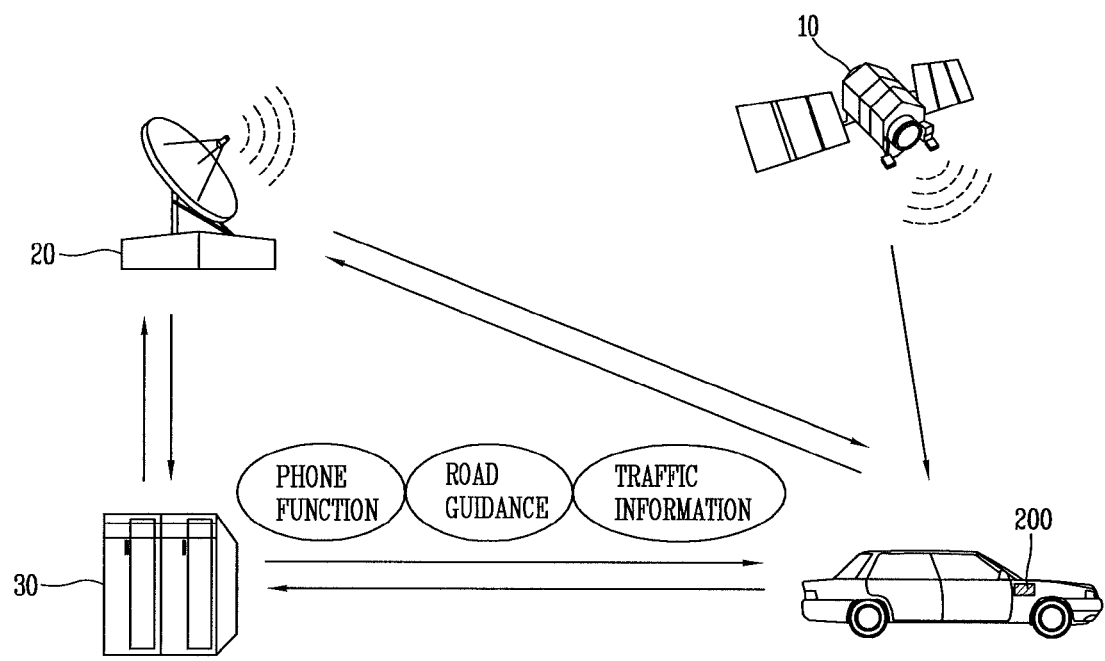
FIG. 2 is a block diagram showing an example vehicle navigation system.

FIG. 2 illustrates an example vehicle navigation system. As illustrated in FIG. 2, a vehicle navigation system includes an information providing center (server) 30 providing traffic information and various types of data (e.g. a program, an execution file, and the like); and a telematics terminal 200 mounted within a vehicle, receiving traffic information through a wide area wireless communication network 20 and/or a local area wireless communication network, and providing a road guidance service on the basis of a satellite 10. The communication network may further include a wired/wireless communication network such as a local area network (LAN) or a wide area network (WAN).

Through the communication network, various types of traffic information (e.g., road traffic information, information regarding a point of interest (POI)) including information regarding a traffic light, are collected, and the collected information is processed by an information providing center 30 (e.g., a server) according to a TPEG (Transport Protocol Expert Group) standard and transmitted to a broadcast station. Then, the broadcast station inserts the traffic information including the information regarding the traffic light into a broadcast signal and broadcasts the same to the telematics terminal 200 of the vehicle. The information providing center 30 (for example, a server) may transmit the traffic information to the telematics terminal 200 of the vehicle through the communication network.

The server reconfigures various types of traffic information, which are collected through various paths connected to the communication network, for example, according to an operator input, through the wired/wireless Internet, from digital broadcast services such as a TDC (Transparent Data Channel) or a MOC (Multimedia Object Transport), from a different server, or from a probe car, into a traffic information format such as a format in conformity with a TPEG (Transport Protocol Expert Group) standard, namely, for example, a standard for a traffic information service, and transmits the same to the broadcast station or the telematics terminal 200.

The server may generate a traffic information format on the basis of the TPEG standard including traffic light information, and transmit the same to the broadcast station.

The broadcast station wirelessly transmits the traffic information including the traffic light information, received from the server, through a broadcast signal such that a traffic information receiving terminal 200, for example, a navigation device, mounted in a vehicle can receive the traffic information. The traffic information may include traffic light information and may also include information regarding various traffic conditions required for vehicle driving in roads, sea traffic, airline flights, such as accidents, a road situation, traffic congestion, road construction, road blockage (or road closure), a public transportation network delay, air transportation holdup, and the like.

The broadcast station receives the processed traffic information including traffic light information from the server and transmits it through digital signals in conformity with various digital broadcast standards to the vehicle 200. In this case, the broadcast standards include a European digital audio broadcasting (DAB) standard on the basis of Eureca-147 [ETSI EN 300 401), a terrestrial or satellite digital multimedia broadcasting (DMB) standard, a terrestrial digital video broadcasting (DVB-T) standard, a mobile digital video broadcasting-handheld (DVB-H) standard, media forward link only (MFLO) standard, and the like.

Also, the broadcast station may transmit the traffic information including the traffic light information through a wired/wireless network such as the wired/wireless Internet.

The vehicle refers to all kinds of carriers, such as general cars, buses, trains, ships, airplanes and the like, which are implemented using machines and electronic devices for the purpose of transporting human beings or things.

The telematics terminal 200 has the traffic information receiving terminal mounted therein, receives traffic light information from the broadcast station using the mounted traffic information receiving terminal, processes the traffic light information, and transfers the processed traffic light information to the user through graphics, text, and/or audio.

Figure 3:
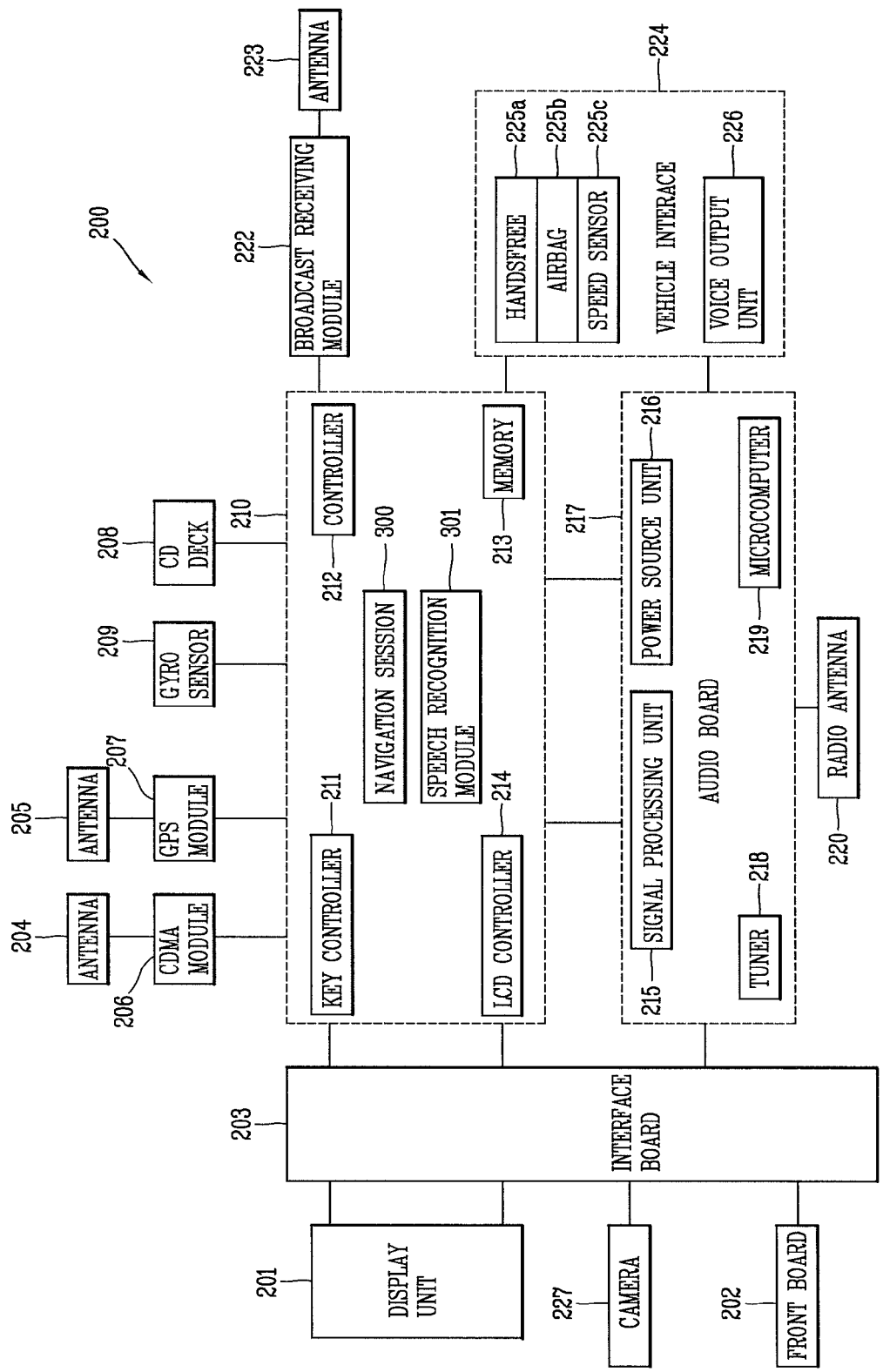
FIG. 3 is a block diagram showing an example configuration of a telematics terminal (e.g., a head unit)

Hereinafter, an example configuration of the telematics terminal (e.g., a head unit) 200 will be described with reference to FIG. 3. FIG. 3 illustrates an example configuration of a telematics terminal (e.g., a head unit) 200.

As illustrated in FIG. 3, the telematics terminal (e.g., the head unit) 200 includes a main board 210 including a controller 212 (e.g., a central processing unit (CPU)) for controlling the telematics terminal 200, a memory 213 for storing various types of information, a key controller 211 for controlling various key signals, and a liquid crystal display (LCD) controller 214 for controlling an LCD.

The memory 213 stores map information (map data) for displaying road guidance information on a digital map. Also, the memory 213 stores a traffic information collecting control process for inputting traffic information according to the situation of a road in which the vehicle currently travels (runs), and information for controlling the process.

The main board 210 may include a code division multiple access (CDMA) module 206 as a mobile terminal having a unique device number assigned and installed in the vehicle, a GPS module 207 for announcing a location of the vehicle, receiving a GPS signal for tracking a travel route from a start point to a destination, or transmitting traffic information collected by the user via a GPS signal, a CD deck 208 for reproducing a signal recorded in a compact disk (CD), a gyro sensor 209 and the like. The CDMA module 206 and the GPS module 207 may transmit and receive signals via antennas 204 and 205.

A broadcast receiving module 222 may be connected with the main board 210 and receive a broadcast signal via an antenna 223. The main board 210 may be connected via an interface board 203 with a display unit (e.g., an LCD) 201 controlled by the LCD controller 214, a front board 202 controlled by the key controller 211, and one or more cameras 227 for capturing the interior and/or the exterior of the vehicle. The display unit 201 may display various video signals and character signals, and the front board 202 may include buttons for various key signal inputs and provide a key signal corresponding to a button selected by the user to the main board 210. In some instances, the display unit 201 may include a proximity sensor of FIG. 2 and a touch sensor (touch screen).

The front board 202 may include a menu key for directly inputting traffic information. The menu key may be controlled by the key controller 211.

An audio board 217 may be connected to the main board 210 and process various audio signals. The audio board 217 may include a microcomputer 219 for controlling the audio board 217, a tuner 218 for receiving a radio signal, a power supply unit 216 for supplying power to the microcomputer 219 and a signal processing unit 215 for processing various voice signals.

The audio board 217 may also include a radio antenna 220 for receiving a radio signal and a tape deck for playing an audio tape.

The audio output unit (amplifier) 226 may be connected to a vehicle interface 224. For instance, the audio board 217 and the main board 210 may be connected to the vehicle interface 224. A hands-free module 225*a* for receiving a voice signal, an airbag 225*b* configured for the security of a passenger, a speed sensor 225*c* for detecting the speed of the vehicle and the like may be connected to the vehicle interface 224. The speed sensor 225*c* may calculate a vehicle speed and provide the calculated vehicle speed information to the CPU 212.

The navigation session 300 applied to the telematics terminal 200 generates road guidance information on the basis of the map data and current location information of the vehicle and provides the generated road guidance information to a user.

The display unit 201 detects a proximity touch within a display window via a proximity sensor. For example, when a pointer (e.g., user's finger or a stylus pen) is proximity-touched, the display unit 201 detects the position of the proximity touch and outputs position information corresponding to the detected position to the controller 212.

A voice recognition module (or a voice recognition engine) 301 recognizes a voice pronounced by the user and performs a corresponding function according to the recognized voice signal.

The navigation session 300 applied to the telematics terminal 200 displays a travel route on map data, and when the location of the mobile communication terminal 100 is within a pre-set distance from a blind spot included in the travel route, the navigation session 300 automatically forms a wireless network with a terminal mounted in an adjacent vehicle (e.g., a vehicle navigation device) and/or a mobile communication terminal carried by a nearby pedestrian through wireless communication (e.g., a short-range wireless communication network), to receive location information of the adjacent vehicle from the terminal mounted in the adjacent vehicle and receive location information of the nearby pedestrian from the mobile communication terminal carried by the nearby pedestrian.

Figure 4:
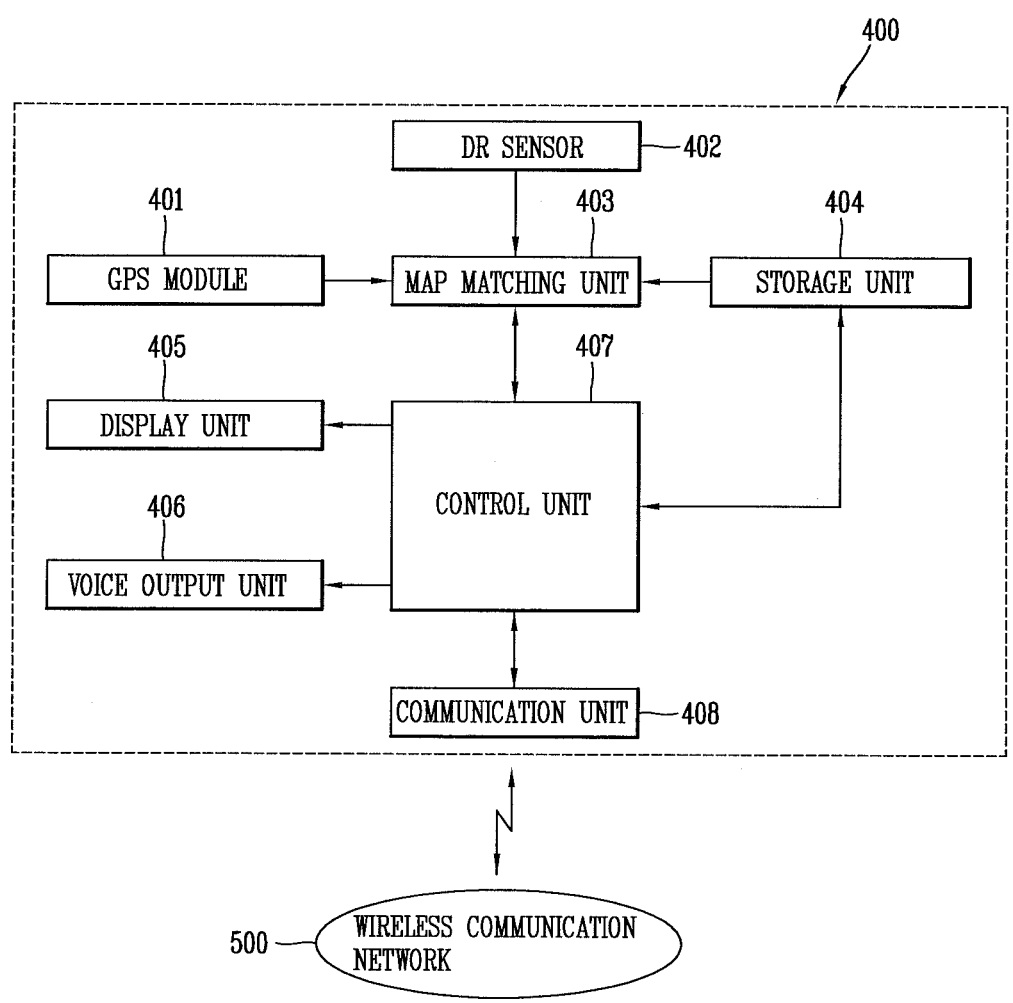
FIG. 4 is a block diagram illustrating an example configuration of a navigation (or vehicle navigation) device.

FIG. 4 illustrates an example configuration of a navigation (vehicle navigation) device 400.

The navigation (vehicle navigation) device 400 is categorized into an in-dash type and an on-dash type according to an installation type in the vehicle 200. The in-dash type navigation (vehicle navigation) device is insertion-fixed to a predetermined space allocated to a dash board of the vehicle 200. The on-dash type navigation (vehicle navigation) device is mounted on a dash board of the vehicle 200, or is installed near the dash board by using a predetermined supporting plate. Since the on-dash type navigation (vehicle navigation) device is detachably mounted, it may be separated from the vehicle 200 for portability.

The navigation (vehicle navigation) device 400 includes not only the in-dash type and the on-dash type, but also an information processing device which can receive and/or process traffic information, e.g., various types of portable terminals which perform a navigation function by interworking with a GPS receiver for receiving a navigation message from a global positioning system (GPS) satellite in the vehicle 200.

As shown in FIG. 4, the navigation device 400 includes a GPS module 401 configured to receive a global positioning system (GPS) signal from a satellite, and configured to generate first vehicle position of the navigation device 400 (regarded to have the same position as the telematics terminal 200 or the mobile communication terminal 100) based on the received GPS signal; a dead-reckoning (DR) sensor 402 configured to generate second vehicle position data based on a driving direction of a vehicle and a speed of the vehicle; a storage unit (or memory) 404 configured to store therein map data and various information; a map matching unit 403 configured to generate a vehicle estimation position based on the first vehicle position data and the second vehicle position data, to match the generated vehicle estimation position with a link (a map matching link or a map matching road) included in the map data stored in the storage unit 404, and to output the matched map information (map matching result); a communication unit 408 configured to receive real-time traffic information from an information providing center and/or a nearby vehicle, through a wireless communication network 500, to receive traffic light information, and to perform a call; a controller 407 configured to generate road guidance information based on the matched map information (map matching result); a display unit 405 configured to display a road guidance map (including information on points of interest (POI)) and the traffic light information; and a voice output unit 406 configured to output road guidance voice information (road guidance voice message) included in the road guidance information, and a voice signal corresponding to the traffic light information.

The communication unit 408 further includes a hands-free device having a Bluetooth module, and may receive a broadcasting signal including traffic information of a TPEG format from a broadcasting station through an antenna. The broadcasting signal includes video and audio data according to various standards such as terrestrial or satellite digital multimedia broadcasting (DMB), digital audio broadcasting (DAB) and digital video broadcasting (DVB-T, DVB-H), but also additional information such as traffic information for traffic information (TPEG) service and data information for binary format for scene (BIFS) service, and various types of additional data. Also, the communication unit 408 tunes a signal bandwidth to which traffic information is provided, demodulates the tuned signal, and outputs the demodulated signal to a TPEG decoder included in the controller 407.

The TPEG decoder decodes traffic information of a TPEG format, and provides, to the controller 407, various types of information such as traffic light information included in the traffic information.

The road guidance information may include not only map data, but also various types of information related to driving, such as lane information, driving limit speed information, turn-by-turn information, traffic safety information, traffic guidance information, vehicle information, and road search information.

A signal received through the GPS module 401, may provide position information of the mobile terminal to the navigation device 400, through wireless communication technology such as 802.11, 802.15, 802.16 and 802.20. IEEE 802.11 is a set of specifications for implementing wireless local area network (WLAN) computer communication proposed by the Institute of Electrical and Electronics Engineers (IEEE) LAN/MAN standards committee. IEEE 0.802.15 is a working group of the Institute of Electrical and Electronics Engineers (IEEE) IEEE 802 standards committee which specifies wireless personal area network (WPAN) standards such as Bluetooth, UWB and Zigbee. IEEE 802.16 is a series of wireless broadband standards written by the Institute of Electrical and Electronics Engineers (IEEE), standards for wireless metropolitan area network broadband wireless access (MAN BWA) such as metropolitan broadband networks (fixed wireless access: FWA). IEEE 802.20 or Mobile Broadband Wireless Access (MBWA) is a specification by the standard association of the Institute of Electrical and Electronics Engineers (IEEE) for mobile wireless Internet access networks such as Wibro and WiMAX.

The navigation device 400 may further include an input unit. The input unit, configured to select a user's desired function or to input information, may be implemented as a keypad, a touch screen, a jog shuttle, a microphone, etc.

The map matching unit 403 is configured to generate a vehicle estimation position based on the first position data and the second position data, and reads map data corresponding to a driving path, from the storage unit 404.

The map matching unit 403 is configured to match the vehicle estimation position with links (roads) included in the map data, and to output the matched map information (map matching result) to the controller 407. For instance, the map matching unit 403 generates a vehicle estimation position based on the first position data and the second position data, and matches the generated vehicle estimation position with links included in the map data stored in the storage unit 404, in order of links. Then, the map matching unit 403 outputs the matched map information (map matching result) to the controller 407. The map matching unit 403 may output, to the controller 407, road attribute information included in the matched map information (map matching result), such as a single-story road or a double-story road. The function of the map matching unit 403 may be executed by the controller 407.

The storage unit 404 is configured to store map data therein. The map data includes geographic coordinates indicating a latitude and a longitude in the unit of degree/minute/second (DMS). The map data may include universal transverse Mercator (UTM) coordinates, universal polar system (UPS) coordinates, transverse Mercator™ coordinates, etc., as well as the geographic coordinates.

The storage unit 404 stores therein various types of menu screens, points of interest (POIs), and various types of information such as function characteristic information according to a specific position of map data.

The storage unit 404 stores therein various user interfaces (UIs) and/or graphic user interfaces (GUIs).

The storage unit 404 stores therein data, programs, etc. required to operate the navigation device 400.

The storage unit 404 stores therein destination information input by a user through the input unit. The destination information may indicate either a destination, or a starting point and a destination.

The display unit 405 displays video information (or a road guidance map) included in road guidance information generated by the controller 407. The display unit 405 includes a touch sensor (touch screen) and a proximity sensor. The road guidance information may include not only map data, but also various types of information related to driving, such as lane information, driving limit speed information, turn-by-turn information, traffic safety information, traffic guidance information, vehicle information, and road search information.

When displaying the video information, the display unit 405 may display various menu screens and various content such as road guidance information, by using a user interface and/or a graphic user interface included in the storage unit 404. The content displayed on the display unit 405 includes various texts or image data (including map data or various types of information data), a menu screen including data such as icons, a list menu and a combo box, and so on.

The voice output unit 406 outputs voice information included in road guidance information generated by the controller 407, or a voice message with respect to the road guidance information. The voice output unit 406 may be implemented as an amplifier or a speaker.

The controller 407 generates road guidance information based on the matched map information, and outputs the generated road guidance information to the display unit 405 and the voice output unit 406. The display unit 405 displays the road guidance information.

The controller 407 generates road guidance information by receiving real-time traffic information from the information providing center and/or a terminal mounted to a peripheral vehicle (vehicle navigation device).

The controller 407 may perform a call by being connected to a call center through the communication unit 408, or may transmit/receive information between the navigation device 400 and the call center. The communication unit 408 further includes a hands-free module having a Bluetooth function using a short-range wireless communication method.

Once a POI search menu is selected by a user, the controller 407 searches for POIs positioned on a path from a current position to a destination, and displays the searched POIs on the display unit 405. The controller 407 searches for a POI positioned on the path (e.g., a point searched without change of the path, such as a POI positioned on the left or right side of a road) and/or a POI positioned near the path (e.g., a point searched after change of the path, such as a point searched after change of a preset path so as to pass through a nearby POI), and displays the searched POI(s) on the display unit 405.

Figure 5:
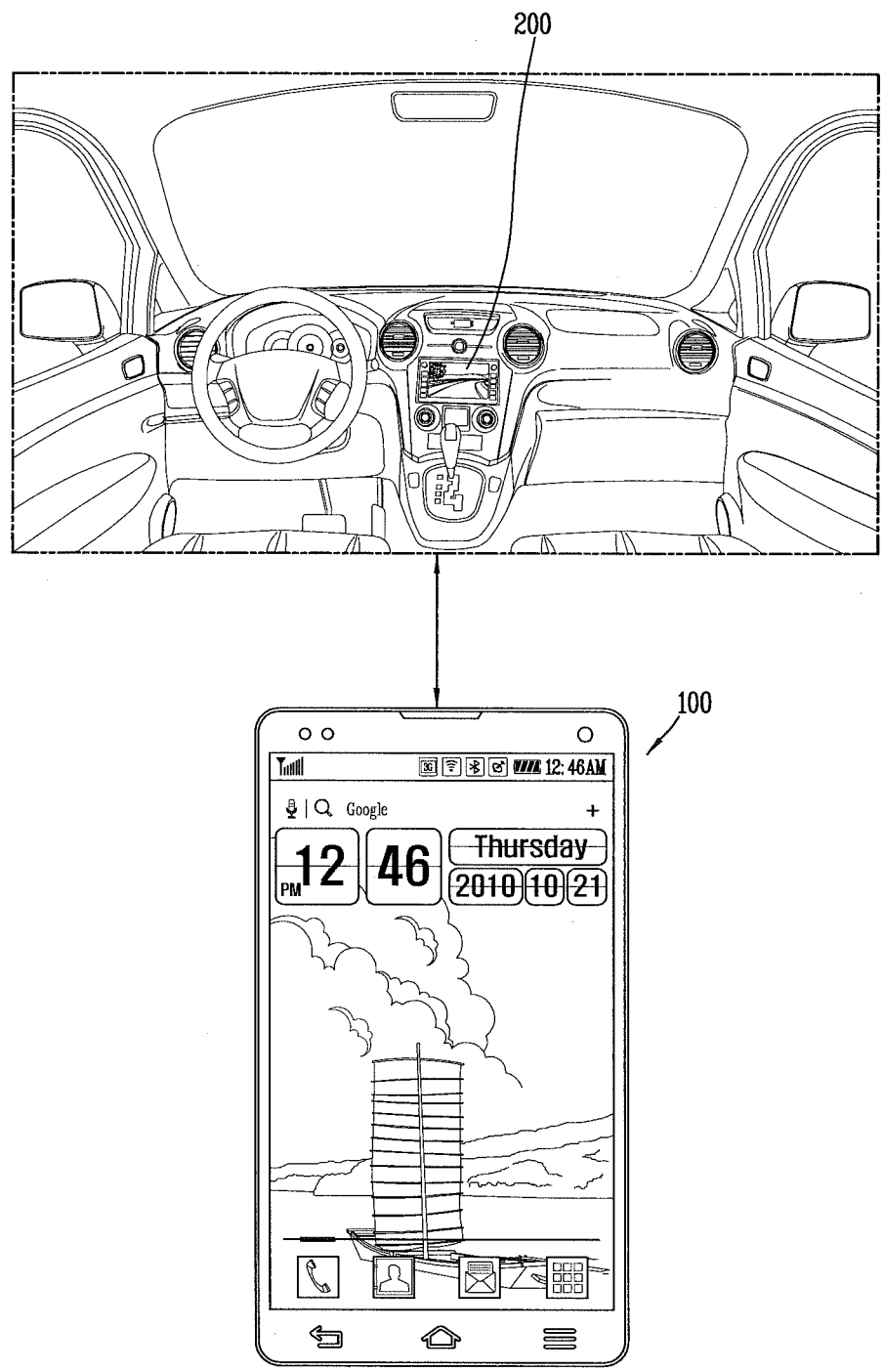
FIG. 5 is a view of an example mobile communication terminal connected to an example telematics terminal (e.g., a head unit)

FIG. 5 illustrates an example mobile communication terminal 100 connected to an example telematics terminal (e.g., head unit) 200.

As shown in FIG. 5, the mobile communication terminal 100 may be connected to the telematics terminal (e.g., head unit) 200 through a wired or wireless communication network. As the telematics terminal 200, a notebook computer, a tablet personal computer (PC), etc. may be used.

Instead of the telematics terminal 200, the navigation device 400 may be used. Instead of the mobile communication terminal 100, a notebook computer, a digital broadcasting terminal, a personal digital assistant (PDA), a portable multimedia player (PMP), a tablet personal computer (tablet PC), etc. may also be used.

The mobile communication terminal 100 and the telematics terminal 200 may be connected to each other by wire or wirelessly to form a virtual network computing (VNC) system. As the VNC system is formed, a user may control the mobile communication terminal 100 using the telematics terminal 200, or may control the telematics terminal 200 using the mobile communication terminal 100.

In some implementations, as described below, the telematics terminal 200 (e.g., tablet PC) may be the mobile terminal.

The mobile terminal 200 is mountable or detachable to/from a dash board of a vehicle. Once the mobile terminal 200 is mounted to the dash board of the vehicle, a general mode of the mobile terminal 200 is automatically converted into a vehicle mode screen (vehicle screen mode), and a plurality of content inside the mobile terminal are displayed on the display unit 201 of the mobile terminal 200 under restrictions on vehicle driving. When mounted to the dash board of the vehicle, the mobile terminal 200 is connected to an electronic controller (ECU) of the vehicle.

Figure 6:
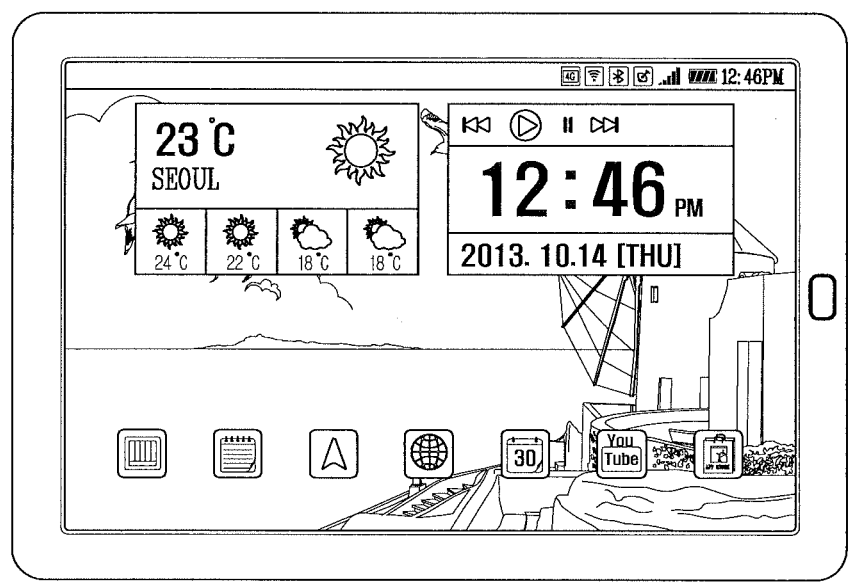
FIG. 6 is a view illustrating an example mode of a mobile terminal.

FIG. 6 illustrates an example general mode of a mobile terminal. As shown in FIG. 6, the mobile terminal 200 displays various content (icons of application programs) on a screen regardless of vehicle restrictions in a general mode, and executes the content according to a user's request. If a navigation application program is executed by a user in a general mode, the mobile communication terminal 100 displays pedestrian navigation information not vehicle navigation information, on the screen.

In the vehicle mode (or on a vehicle mode screen), the mobile terminal 200 receives vehicle information from the vehicle, synchronizes the received vehicle information with personal information and mobile information of a server, and displays the synchronized information. When detached from the vehicle, the mobile terminal 200 automatically converts the vehicle mode into the general mode, and records information on a driving record of the vehicle.

An example of a method of controlling the mobile terminal is described below. Firstly, the controller 212 determines whether the mobile terminal 200 has been mounted to the vehicle. For instance, once the mobile terminal 200 is connected to an electronic controller (ECU) of the vehicle through a wired or wireless communication network, the controller 212 determines that the mobile terminal 200 has been mounted to the vehicle (e.g., the dash board of the vehicle).

The mobile terminal 200 may further include a sensing unit configured to sense a connected state of the mobile terminal 200 with the vehicle. For instance, the sensing unit may sense whether the mobile terminal 200 has been connected to the electronic controller (ECU) of the vehicle, or a port of the ECU of the vehicle, and may output a sensing signal to the controller 212 to thus generate a notification signal indicating that the mobile communication terminal 100 has been connected to the vehicle. Then, the mobile terminal 200 may display the notification signal on the display unit 151. The sensing unit, configured to sense a connected state between the mobile terminal 200 and the vehicle, may be operated automatically or manually.

Once the mobile terminal 200 is mounted to the vehicle, the controller 212 may display navigation data (map data) installed in the mobile terminal 200, on the display unit 201.

Once the mobile terminal 200 is mounted to the vehicle, the controller 212 receives pre-registered identification information on a vehicle driver (e.g., universally unique identifier, UUID) from the ECU of the vehicle.

The controller 212 authenticates the mobile terminal 200, based on the pre-registered identification information on a vehicle driver (e.g., universally unique identifier, UUID) received from the ECU of the vehicle, and identification information registered to the memory 213 (e.g., universally unique identifier, UUID). For instance, if the received pre-registered identification information on a vehicle driver matches the identification information registered to the memory 213, the controller 212 allows information exchange between the mobile terminal 200 and the ECU of the vehicle.

The controller 212 may authenticate the mobile terminal 200 based on the pre-registered identification information on a vehicle driver, the identification information registered to the memory 213, and personal information pre-registered to a server (e.g., an ID and a password registered by a user of the mobile terminal).

Once the mobile terminal 200 is authenticated, the controller 212 receives vehicle information from the ECU of the vehicle. The vehicle information may include information on conditioning equipment of the vehicle (e.g., temperature level information of a heater or an air conditioner), engine oil amount information, engine temperature information, tire pneumatic pressure information, battery information, radio channel setting information, information on a current speed of the vehicle, information on revolution per minute (RPM) of the vehicle, information on a steering angle of the vehicle, information related to a brake of the vehicle, etc.

The controller 212 detects content corresponding to personal information among a plurality of contents of the mobile terminal. The content corresponding to personal information may include a schedule application program (scheduler), a social networking service (SNS) application program (Facebook, Kakao talk, Twitter, Youtube, etc.), an email application program, a phone book application program, a moving image application program, etc. The content corresponding to personal information may further include a media application program.

The controller 212 implements a vehicle mode screen, based on the content corresponding to personal information among a plurality of content of the mobile terminal, vehicle information and navigation information. Then, the controller 212 displays the vehicle mode screen on the display unit 201. The content corresponding to personal information may be synchronized with a server and/or a user's cellular phone.

Figure 7:
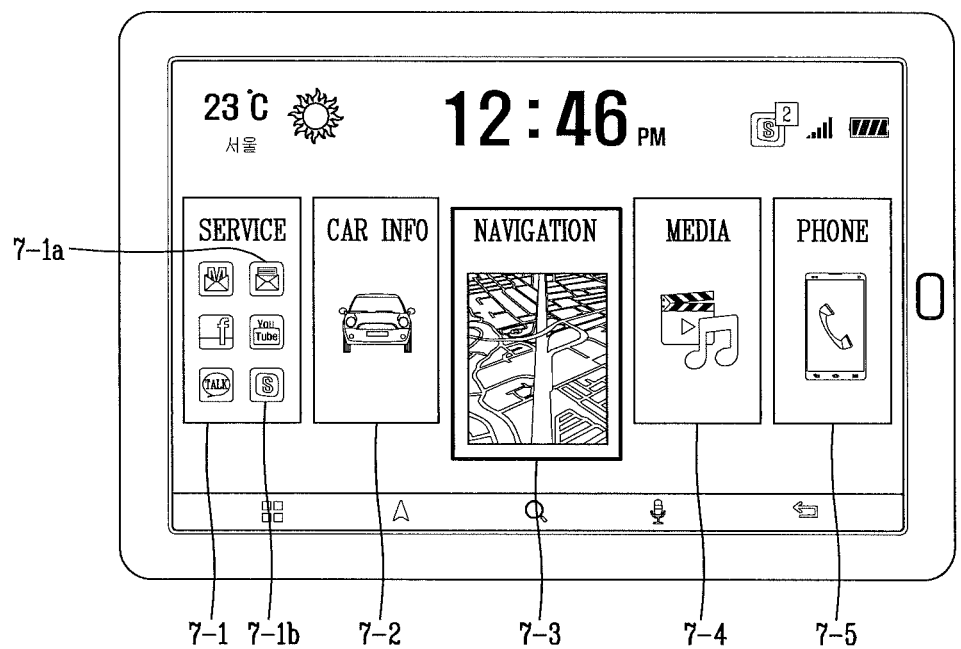
FIG. 7 is a view illustrating an example vehicle mode screen displayed on a mobile terminal.

FIG. 7 illustrates an example vehicle mode screen displayed on a mobile terminal. As shown in FIG. 7, the vehicle mode screen includes a first region 7-1 for displaying content corresponding to personal information among a plurality of content of the mobile terminal, a second region 7-2 for displaying vehicle information, and a third region 7-3 for displaying navigation information indicating a path from a current position to a destination.

The vehicle mode screen may further include a fourth region 7-4 for displaying media data (e.g., film, music video, drama, etc.), and a fifth region 7-5 for displaying an icon for a call. Once the icon for a call is selected by a user, the controller 212 performs a call.

If an email icon 7-1a is selected from the first region 7-1 for displaying content corresponding to personal information among a plurality of content of the mobile terminal, the controller 212 executes an application program corresponding to the selected email icon 7-1a, thereby displaying email content on the first region 7-1. If the email icon 7-1a is selected when the vehicle is running, the controller 212 converts email content corresponding to the selected email icon 7-1a into a voice signal, and outputs the voice signal through the voice output unit 226.

If a schedule icon 7-1b is selected from the first region 7-1 for displaying content corresponding to personal information, the controller 212 executes an application program corresponding to the selected schedule icon 7-1b, thereby displaying schedule content on the first region 7-1. If the schedule icon 7-1b is selected when the vehicle is running, the controller 212 converts schedule content corresponding to the selected schedule icon 7-1b into a voice signal, and outputs the voice signal through the voice output unit 226.

If the second region 7-2 for displaying vehicle information is selected, the controller 212 may display at least one of information on conditioning equipment of the vehicle (e.g., temperature level information of a heater or an air conditioner), engine oil amount information, engine temperature information, tire pneumatic pressure information, battery information, radio channel setting information, etc., on the second region 7-2 or an entire region of the display unit 201.

In the mobile terminal and the method of controlling the same, when a user mounts the mobile terminal to the vehicle, a general mode of the mobile terminal is automatically converted into a vehicle mode. This can allow the user to check the vehicle mode rapidly and easily.

In the mobile terminal and the method of controlling the same, when a user mounts the mobile terminal to the vehicle, a vehicle mode screen is displayed based on the content corresponding to personal information within the mobile terminal, vehicle information and navigation information. This can allow the user to check a personal vehicle mode screen.

In the mobile terminal and the method of controlling the same, when a user mounts a mobile terminal to a vehicle, a vehicle mode screen is displayed based on the content corresponding to personal information within the mobile terminal, vehicle information and navigation information. Further, when the vehicle is running, the content corresponding to personal information on the vehicle mode screen is changed under restrictions on vehicle driving, and then is output. This can allow a driver of the vehicle to drive safely.

The telematics terminal (e.g., the head unit) 200 mounted to the vehicle may be connected to a plurality of mobile communication terminals inside the vehicle, and the plurality of mobile communication terminals may be connected to each other through a wireless or wired communication network. The telematics terminal 200 may be used by a vehicle driver, and the plurality of mobile communication terminals 100 may be used by vehicle passenger(s).

Instead of the telematics terminal 200, a navigation device or the mobile communication terminal 100 may be used. Instead of the plurality of mobile communication terminals 100, a plurality of rear seat entertainment systems (RSEs), a plurality of cellular phones, a plurality of smartphones, a plurality of notebook computers, a plurality of digital broadcasting terminals, a plurality of personal digital assistants (PDAs), a plurality of portable multimedia players (PMPs), a plurality of tablet personal computers (PCs), and the like, may also be used. Hereinafter, the telematics terminal 200 and one or more mobile communication terminals 100 will be described as an example.

The telematics terminal 200 interworks with a plurality of terminals within a vehicle and receives an application program desired by a user from the plurality of terminals and execute the received application program, thereby effectively using information (for example, an application program, content, data, and the like) stored in each of the plurality of terminals.

The mobile communication terminal 100 interworks with the telematics terminal 200 within the vehicle and other mobile communication terminals within the vehicle, receives an application program desired by a user from the telematics terminal 200 and the other mobile communication terminals, and executes the received application program, thereby effectively using information (for example, an application program, content, data, and the like) stored in each of the plurality of terminals.

Hereinafter, description will be given of a mobile communication system including a telematics terminal (e.g., the head unit) 200 and an auxiliary terminal connected to the telematics terminal 200, with reference to FIGS. 8 and 9. For example, the auxiliary terminal connected to the telematics terminal 200 detects functions (e.g., application programs, contents, data, etc.), which are available in the telematics terminal 200, based on attributes of the telematics terminal 200, and provides the detected functions to the telematics terminal 200. In some examples, a method is provided which enables the use of new services which have not been provided, in a manner of connecting an additional device (auxiliary terminal) in the vehicle. In these examples, to the use of new services may overcome disadvantages of hard replacement of the telematics terminal 200 and hard upgrade due to a much longer life cycle of the telematics terminal 200 than that of a smart phone. Also, these examples may provide a new function while maintaining an existing human machine interface (HMI), such as "Android Auto" or "CarPlay", as it is, not by using a method which is heterogeneous from the existing HMI of a vehicle.

Figure 8:
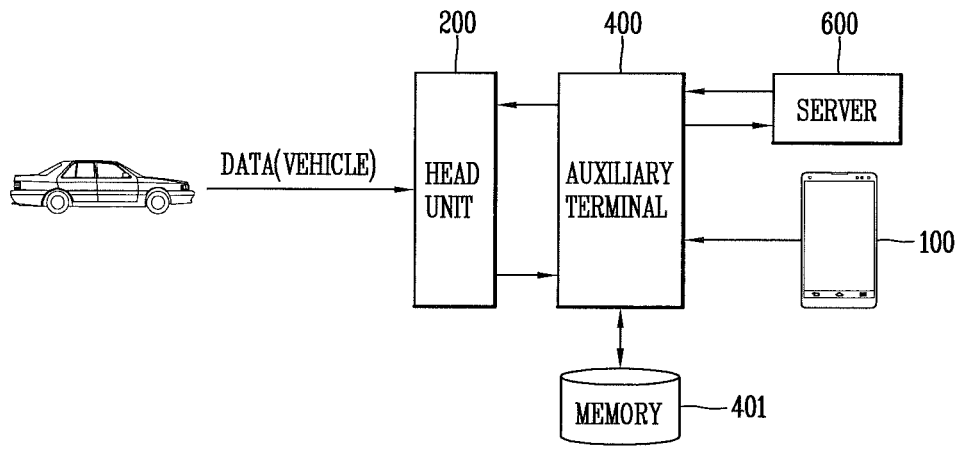
FIG. 8 is a view illustrating an example configuration of a mobile communication system.

FIG. 8 illustrates an example configuration of a mobile communication system. The auxiliary terminal 400 may be electrically attachable to or detachable from the telematics terminal (e.g., the head unit) 200. The auxiliary terminal 400 may further include a memory (or a storage unit) 401, and may be connected to a server 600 and/or a mobile communication terminal (external mobile terminal) 100.

Figure 9:
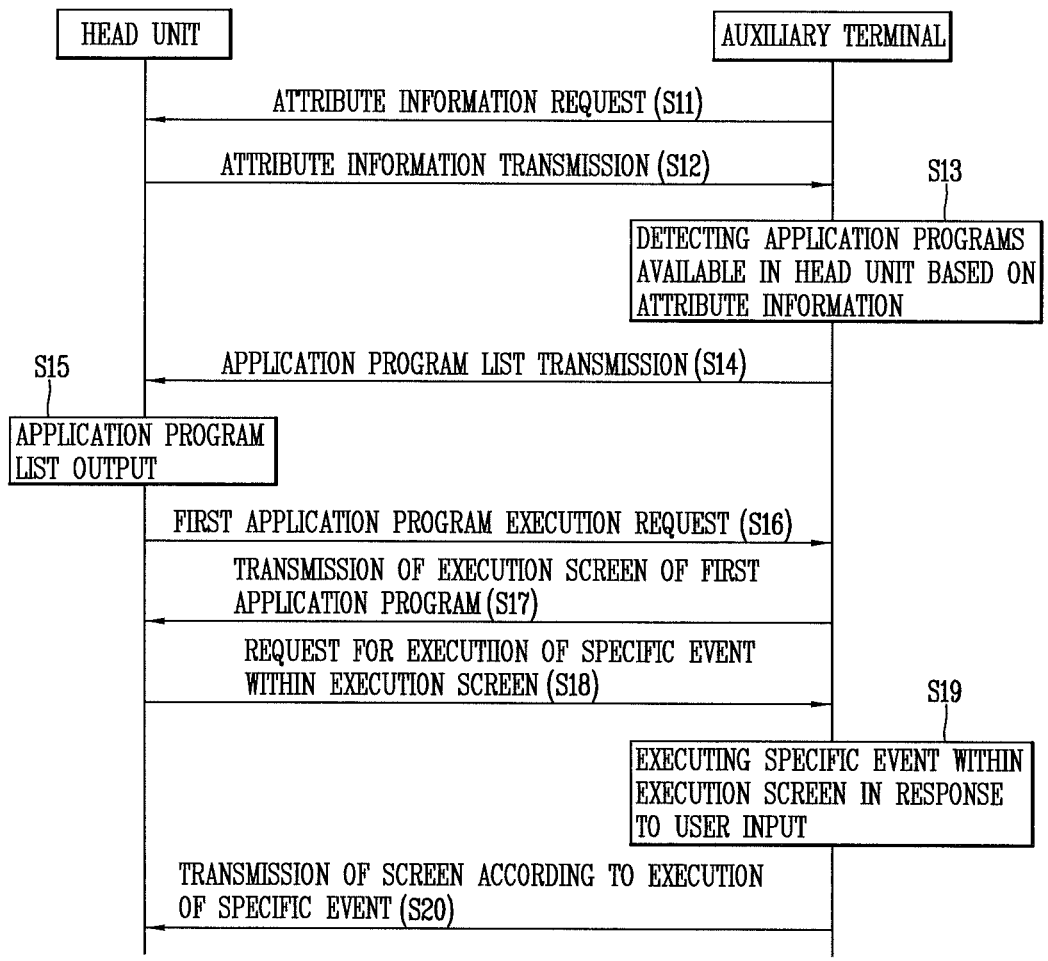
FIG. 9 is a flowchart illustrating an example method of controlling a mobile communication system.

FIG. 9 illustrates an example method of controlling a mobile communication system. First, the controller 212 of the telematics terminal (e.g., the head unit) 200 accesses (connects to or performs communication with) the telematics terminal 200 through a wired or wireless communication network. Or, the auxiliary terminal 400 may access (connects to or performs communication with) the telematics terminal 200 through a wired or wireless communication network.

When the auxiliary terminal 400 accesses the telematics terminal (e.g., the head unit) 200, the auxiliary terminal 400 requests attribute information related to the telematics terminal 200 from the telematics terminal (e.g., the head unit) 200 (S11). The attribute information may include a screen resolution, a screen size and an application program list, and like information associated with the telematics terminal 200.

The controller 212 of the telematics terminal 200 transmits the attribute information to the auxiliary terminal 400 (S12).

The auxiliary terminal 400 then detects application programs, which can be used on the telematics terminal (e.g., the head unit) 200, on the basis of the attribute information related to the telematics terminal 200 (S13). For example, the auxiliary terminal 400 detects application programs, which are not included in the application program list of the telematics terminal 200 and are available in the telematics terminal 200, from at least one of the memory 401, the server 600, the mobile communication terminal (e.g., the external mobile terminal) 100.

The auxiliary terminal 400 may also selectively transmit information (e.g., contents, application programs, data, etc.), received from the server 600 or the external mobile terminal 100, to the telematics terminal 200.

The auxiliary terminal 400 may classify the information (e.g., contents, application programs, data, etc.), received from the server 600 or the external mobile terminal 100, according to preset priorities, and then provide the classified information to the telematics terminal 200 according to the priorities. The controller 212 of the telematics terminal 200 outputs the classified information, which has been provided according to the priorities, on the display unit 201.

The auxiliary terminal 400 and the external mobile terminal 100 may exchange data through a dedicated application program for data exchange.

The auxiliary terminal 400 generates an application program list including (or indicating) the detected usable application programs, and transmits the generated application program list to the controller 212 of the telematics terminal 200 (S14). The auxiliary terminal 400 generates the application program list, which matches the screen resolution and the screen size of the telematics terminal 200, and transmits the generated application program list to the controller 212 of the telematics terminal 200.

The controller 212 of the telematics terminal 200 receives the generated application program list from the auxiliary terminal 400, and outputs the received application program list on the display unit 201 (S15).

Upon receiving a user input (e.g., a user's touch, a user's long touch, etc.) for requesting an execution of a first application program included in the output application program list, the controller 212 of the telematics terminal 200 requests for the execution of the first application program from the auxiliary terminal 400 (S16). The first application program may be at least one of an application program of processing a high-quality image, an application program of processing a high-quality sound (audio), an application program of processing high performance computing, an application program of analyzing and processing advanced driving assist system (ADAS) image (e.g., recognizing a moving object, sensing a guide board, sensing a lane, recognizing a signboard, etc.), an application program of processing a camera image (e.g., face recognition, drowsiness sensing, etc.), and the like. Those application programs are not executable on the telematics terminal 200 but executable on the auxiliary terminal 400.

The auxiliary terminal 400 executes the first application program in response to the request, and transmits an execution screen (image) according to the execution result of the first application program to the controller 212 of the telematics terminal 200 (S17). For example, the auxiliary terminal 400 configures the execution screen (image) according to the execution result of the first application program to match the screen resolution and the screen size of the telematics terminal 200, and transmits the configured execution screen (image) to the controller 212 of the telematics terminal 200.

The controller 212 of the telematics terminal 200 then outputs the execution screen (image) according to the execution result of the first application program on the display unit 201.

Upon receiving a user input (e.g., a key signal, a user's short touch, a user's long touch, etc.) for requesting an execution of a specific event within the execution image of the first application program output on the display unit 201, the controller 212 of the telematics terminal 200 requests for an execution of the specific event from the auxiliary terminal 400 (S18). The specific event may be a sub function within the execution image of the first application program. For example, if it is assumed that the execution image of the first application program is an execution image of an application program of processing a high-quality image, the specific event within the execution image of the first application program may be a video play button, a video stop button, a video forward button, and the like.

The auxiliary terminal 400 then executes the specific event within the execution image of the first application program in response to the request for the execution of the specific event (S19), and transmits an execution screen according to the execution result of the specific event to the telematics terminal 200 (S20). The auxiliary terminal 400 configures the execution screen according to the execution result of the specific event to match the screen resolution and the screen size of the telematics terminal 200, and transmits the configured execution screen according to the execution of the specific event to the telematics terminal 200.

For example, when the telematics terminal (e.g., the head unit) 200 requests for an execution of a video play button within an execution image of an application program which processes a high-quality image, the auxiliary terminal 400 executes the video play button and transmits the video, which is played back in response to the execution of the video play button, to the telematics terminal (e.g., the head unit) 200 in real time. Accordingly, the telematics terminal (e.g., the head unit) 200 may be provided with the video played back, in response to the execution of the application program processing the high-quality image, from the auxiliary terminal 400, even without executing the application program processing the high-quality image thereon.

The telematics terminal 200 may also transmit a hardware resource usage (e.g., an amount of hardware resources consumed) thereof to the auxiliary terminal 400 in a periodical manner. For example, the telematics terminal 400 may periodically transmit information relating to capabilities, loads of the CPU, available memories and the like to the auxiliary terminal 400. The auxiliary terminal 400 may also periodically detect the consumed amount of hardware resources of the telematics terminal 200.

When the resource usage of the telematics terminal 200 exceeds a predetermined reference (for example, when the shortage of resources of the telematics terminal 200 is sensed), the auxiliary terminal 400 transmits the request for the use of the resources to the telematics terminal 200.

When the telematics terminal (e.g., the head unit) 200 accepts the request for the use of the resources, the auxiliary terminal 400 uses the resources of the telematics terminal 200. For example, when the telematics terminal (e.g., the head unit) 200 accepts the request for the use of the resources, the auxiliary terminal 400 executes an application program which requires for the use of the CPU and the memory of the telematics terminal 200, and transmits an execution result of the application program to the telematics terminal 200.

Hereinafter, description will be given of an example method by which the auxiliary terminal 400 selectively upgrades/updates application programs of the telematics terminal (e.g., the head unit) 200 when the telematics terminal 200 does not have a modem, with reference to FIGS. 10A to 10C.

Figure 10A:
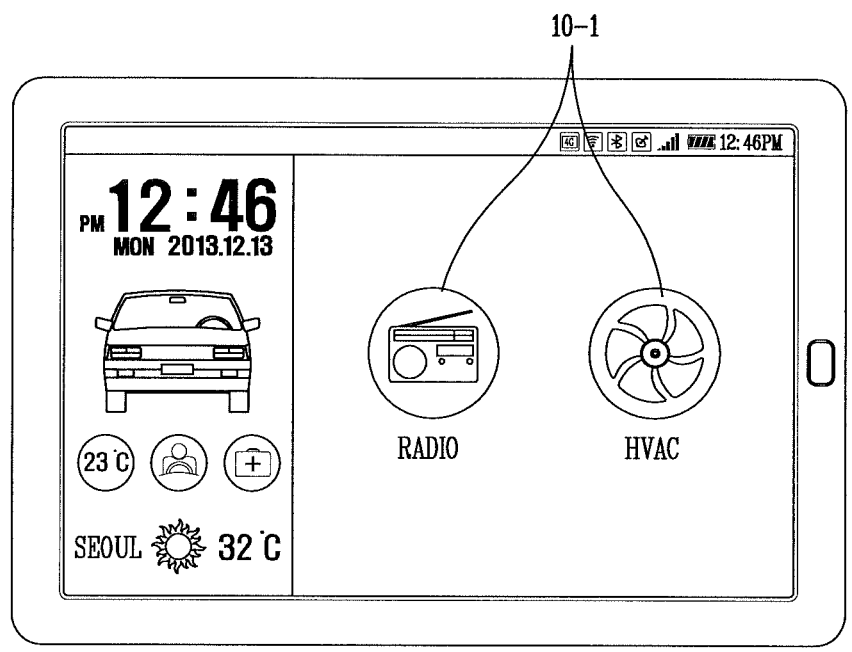
FIG. 10A is a view illustrating an example vehicle mode screen displayed on a telematics terminal (e.g., a head unit)

FIG. 10A illustrates an example vehicle mode screen displayed on a telematics terminal (e.g., a head unit) 200. FIGS. 10B to 10C illustrates an example vehicle mode screen displayed on a telematics terminal (e.g., a head unit) 200.

As illustrated in FIG. 10A, a vehicle mode screen may include thereon icons 10-1 for turning on a radio and controlling a heating, ventilation and air conditioning (HVAC) system.

Figure 10B:
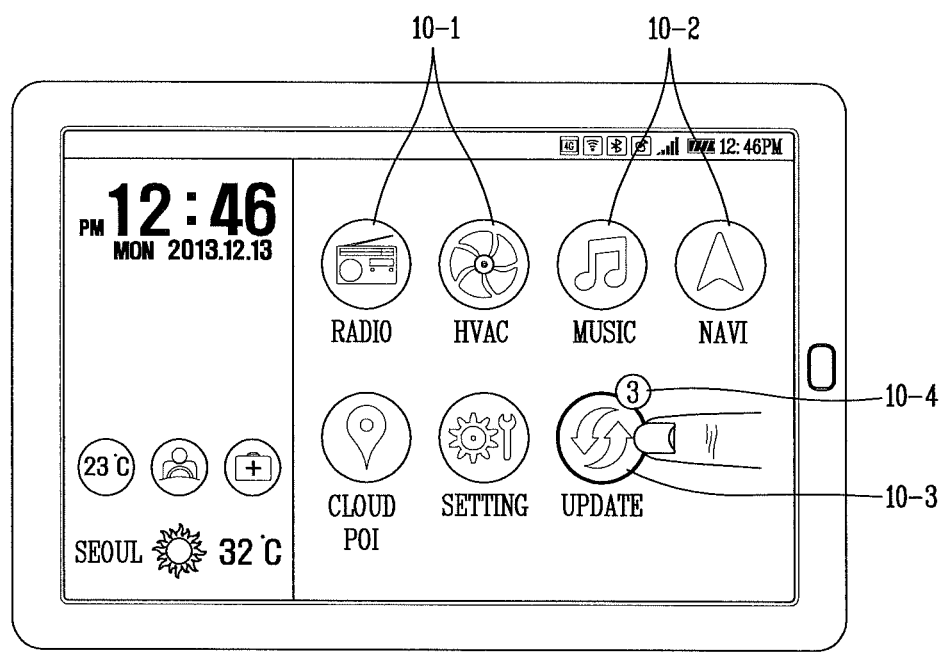
FIGS. 10B to 10C are views illustrating an example vehicle mode screen displayed on a telematics terminal (e.g., a head unit)

FIG. 10B is an exemplary view illustrating a vehicle mode screen (e.g., a home screen) output on the telematics terminal (e.g., the head unit) 200. As illustrated in FIG. 10B, the telematics terminal (e.g., the head unit) 200 receives application programs from the auxiliary terminal 400, installs the received application programs, and outputs icons 10-2 corresponding to the installed application programs, respectively, on the vehicle mode screen (e.g., the home screen). The icons 10-2 may include an icon for playing back music or a video, a navigation icon for receiving map data, an icon for providing vehicle data, an icon for providing POI information, an icon for setting the vehicle mode, and the like.

The telematics terminal (e.g., the head unit) 200 may simultaneously output those icons 10-2 indicating the plurality of application programs on the vehicle mode screen, which may allow the user to immediately execute a desired application program.

When one of the icons 10-2 output on the vehicle mode screen (or the home screen) is selected, the telematics terminal 200 immediately executes the application program corresponding to the selected icon.

The telematics terminal (e.g., the head unit) 200 and the auxiliary terminal 400 may be connected to each other through USB, Wi-Fi, Bluetooth™ and the like.

The auxiliary terminal 400 receives information relating to application programs (application program information) (for example, firmware versions, a version of each application program, properties and attributes of various application programs, etc.) of the telematics terminal 200.

The auxiliary terminal 400 searches for application programs, which is required to be updated in the telematics terminal 200, from the server or the external mobile terminal on the basis of the received application program information. The auxiliary terminal 400 downloads (or receives) from the server or the external mobile terminal an update list (e.g., an available update list) indicating the searched application programs required to be updated, and transmits (notifies) the downloaded update list to the telematics terminal 200.

The telematics terminal (e.g., the head unit) 200 receives the notified update list (e.g., the available update list) from the auxiliary terminal 400, generates an icon 10-3 indicating the successful reception of the update list, and outputs the generated icon 10-3 on the vehicle mode screen. The telematics terminal 200 may also output notification information 10-4, which indicates the number of updatable application programs on the icon 10-3 on the basis of the update list.

Figure 10C:
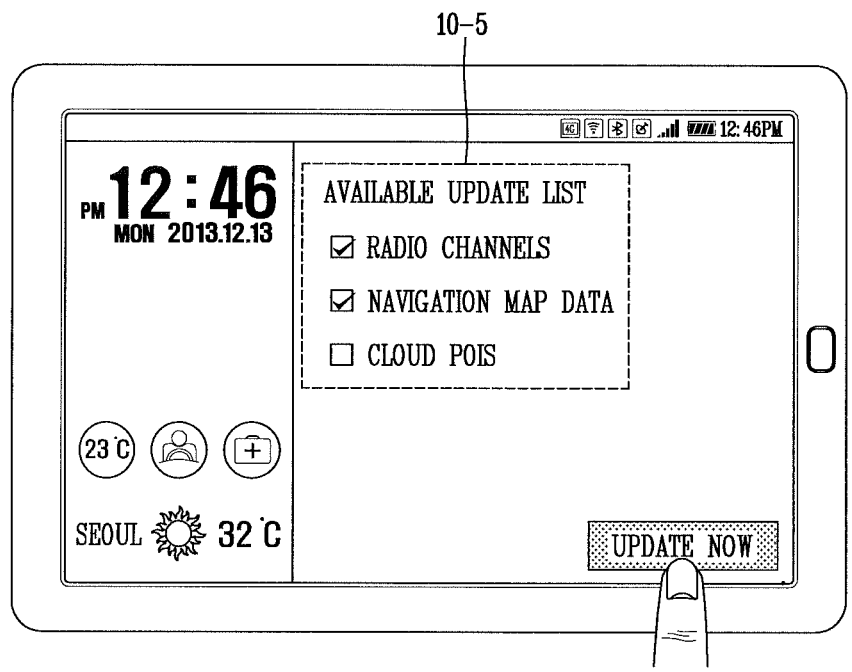

As illustrated in FIG. 10C, when the icon 10-3 is selected by the user, the telematics terminal (e.g., the head unit) 200 outputs the update list (e.g., the available update list) 10-5 on the vehicle mode screen. The user may thusly select an application desiring to update (for example, radio channel update, navigation map data update, cloud server POI update, etc.) while viewing the update list 10-5.

The telematics terminal 200 requests the auxiliary terminal 400 to update an item selected by the user from the update list 10-5. The auxiliary terminal 400 then updates the user-selected update item in response to the update request. For example, when the user-selected update item is an item for updating the navigation map data, the auxiliary terminal 400 receives an updated navigation map data from the server or the external mobile terminal, and transmits the updated navigation map data to the telematics terminal 200, thereby updating the navigation map data of the telematics terminal 200.

FIG. 11 illustrates an example architectural overview of a mobile communication system. As illustrated in FIG. 11, the telematics terminal (e.g., the head unit) 200, the auxiliary terminal 400 and the mobile communication terminal (or the external mobile terminal) 100 may exchange data through the same communication protocol and software (SW) framework. The telematics terminal 200 may additionally be connected with a display unit and a user input unit.

Figure 12:
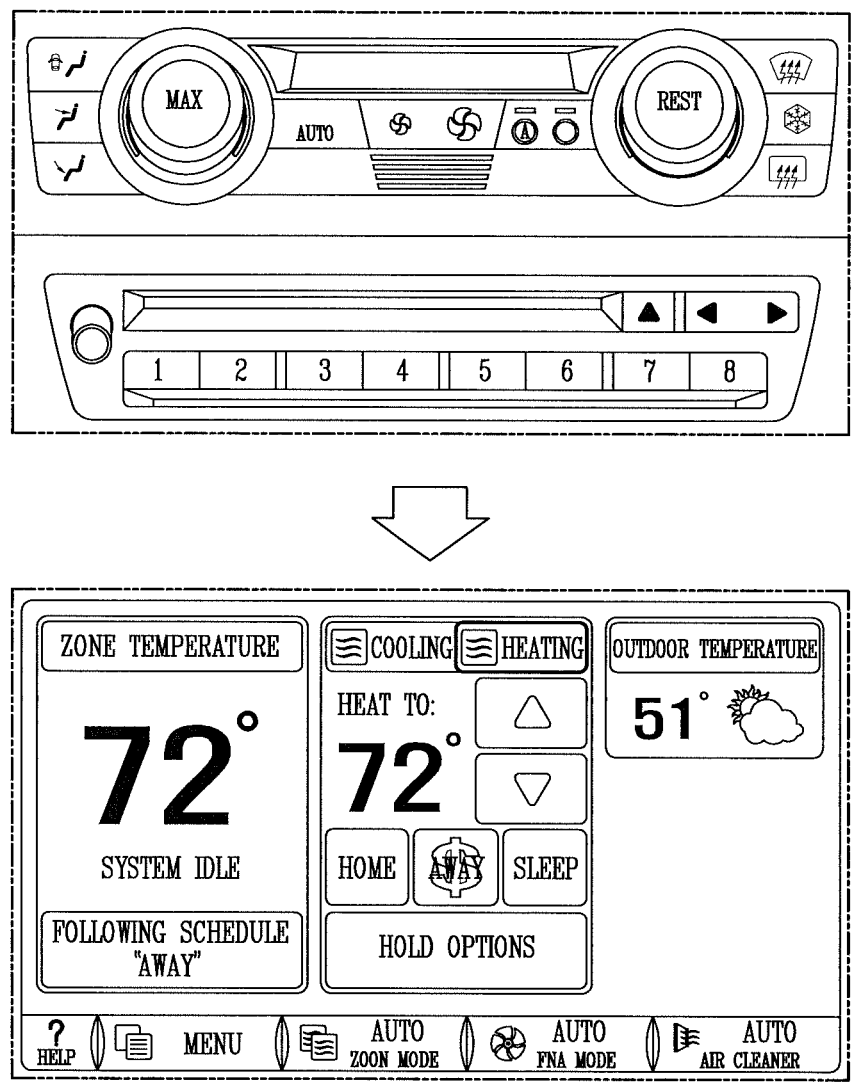
FIG. 12 is a view illustrating an example vehicle mode screen provided from an auxiliary terminal to a telematics terminal (e.g., a head unit).

FIG. 12 illustrates an example vehicle mode provided from an auxiliary terminal to a telematics terminal (e.g., a head unit). As illustrated in FIG. 12, the auxiliary terminal 400 may provide the same functions as functions included in the vehicle mode screen of the telematics terminal 200. Or, the auxiliary terminal 400 may also generate a vehicle mode screen including improved GUI/UI by upgrading/updating a function included in the vehicle mode screen of the telematics terminal 200 and provide the generated vehicle mode screen to the telematics terminal 200. That is, a graphic user interface (GUI) theme corresponding to the vehicle mode screen of the telematics terminal 200 can change by using the auxiliary terminal 400.

The auxiliary terminal 400 may extend the function included in the vehicle mode screen of the telematics terminal 200, and reflect the extended function to the vehicle mode screen of the telematics terminal 200.

For example, the auxiliary terminal 400 may receive today's weather data from the server, and reflect an automatic temperature setting service or a temperature setup recommending service based on the received today's weather data to the vehicle mode screen of the telematics terminal 200. When a current temperature is over 28° C., the auxiliary terminal 400 may set the air conditioner of the vehicle to be automatically turned on. Or, when humidity is over 70%, the auxiliary terminal 400 may display information for checking whether or not to turn on the air conditioner on the vehicle mode screen of the telematics terminal 200.

As described above, in a mobile communication system and a control method thereof, an additional device (auxiliary terminal) may be connected to a mobile terminal (for example, a head unit) mounted in a vehicle, so as to provide new services to the mobile terminal (for example, the head unit) through the additional device (auxiliary terminal).

As the present features may be embodied in several forms without departing from the characteristics thereof, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile communication system comprising:
a first terminal mounted in a vehicle; and
a second terminal configured to transmit, to the first terminal, an application program list indicating application programs available in the first terminal,
wherein the first terminal is configured to output, on a display unit, the application program list and request the second terminal to execute a first application program included in the application program list,
wherein the second terminal is configured to execute the first application program in response to the request, and transmit, to the first terminal, a first execution screen according to an execution result of the first application program,
wherein the first terminal is configured to request the second terminal to execute a specific event within the first execution screen, and
wherein the second terminal is configured to execute the specific event within the first execution screen in response to the request for the execution of the specific event, and transmit, to the first terminal, a second execution screen according to an execution result of the specific event.

2. The system of claim 1, wherein the second terminal is configured to detect the application programs available in the first terminal on the basis of attribute information relating to the first terminal.

3. The system of claim 2, wherein the attribute information related to the first terminal includes a screen resolution, a screen size, and an application program list of the first terminal.

4. The system of claim 3, wherein the first application program is an application program which is not present in the application program list of the first terminal and is available in the first terminal.

5. The system of claim 3, wherein the second terminal is configured to modify the first and second execution screens to match a screen resolution and a screen size of the first terminal, and transmit, to the first terminal, the modified first and second execution screens.

6. The system of claim 1, wherein the second terminal is configured to detect the application programs available in the first terminal from a memory of the second terminal, a server, or an external mobile terminal.

7. The system of claim 1, wherein the second terminal is configured to selectively transmit, to the first terminal, information received from a server or external mobile terminal.

8. The system of claim 1, wherein the second terminal is configured to classify information received from a server or external mobile terminal according to preset priorities, and transmit the classified information to the first terminal according to the preset priorities.

9. The system of claim 1, wherein the second terminal is configured to periodically detect a resource usage of the first terminal, use resources of the first terminal based on the resource usage of the first terminal exceeding a preset reference, and transmit, to the first terminal, result information in response to the use of the resources, or wherein the first terminal is configured to periodically detect a resource usage of the second terminal, use resources of the second terminal based on the resource usage of the second terminal exceeding a preset reference, and transmit, to the second terminal, result information in response to the use of the resources.

10. The system of claim 1, wherein the second terminal is configured to update an application program of the first terminal by receiving, from a server or an external mobile terminal, data for updating the application program of the first terminal and transmitting, to the first terminal, the received data.

11. The system of claim 1, wherein the first terminal is configured to output icons indicating the application programs included in the application program list on a vehicle home screen, and
wherein the second terminal is configured to change a graphic user interface theme corresponding to the vehicle home screen.

12. An auxiliary terminal comprising:
a controller that is configured to:
perform communication with a first terminal mounted in a vehicle,
transmit, to the first terminal, an application program list indicating application programs available in the first terminal,
wherein the controller is configured to execute a first application program included in the application program list in response to a request of the first terminal, and transmit, to the first terminal, a first execution screen according to an execution result of the first application program,
wherein the controller is further configured to, based on the first terminal requesting the auxiliary terminal to execute a specific event within the first execution screen, execute the specific event within the first execution screen in response to the request for the execution of the specific event, and transmit, to the first terminal, a second execution screen according to an execution result of the specific event.

13. A method for controlling a mobile communication system, the method comprising:
transmitting, to the first terminal, an application program list indicating the detected application programs available in the first terminal;
outputting, by the first terminal and on a display unit of the first terminal, the application program list;
requesting the second terminal to execute a first application program included in the application program list;
executing, by the second terminal, the first application program in response to the request;
transmitting, to the first terminal, a first execution screen according to an execution result of the first application program;
requesting, by the first terminal, the second terminal to execute a specific event within the first execution screen;
executing, by the second terminal, the specific event within the first execution screen in response to the request for the execution of the specific event; and
transmitting, to the first terminal, a second execution screen according to an execution result of the specific event.

14. The method of claim 13, wherein detecting, by the second terminal, application programs available in the first terminal comprises detecting, by the second terminal, the application programs available in the first terminal on the basis of attribute information relating to the first terminal.

15. The method of claim 14, wherein the attribute information related to the first terminal includes a screen resolution, a screen size, and an application program list of the first terminal.

16. The method of claim 15, wherein the first application program is an application program which is not present in the application program list of the first terminal and is available in the first terminal.

17. The method of claim 15, further comprising modifying, by the second terminal, the first and second execution screens to match a screen resolution and a screen size of the first terminal, and transmitting, to the first terminal, the modified first and second execution screens.

18. The method of claim 13, wherein detecting, by the second terminal, application programs available in the first terminal comprises detecting, by the second terminal, the application programs available in the first terminal from a memory of the second terminal, a server, or an external mobile terminal.

19. The method of claim 13, further comprising selectively transmitting, by the second terminal and to the first terminal, information received from a server or external mobile terminal.

20. The method of claim 13, further comprising classifying, by the second terminal, information received from a server or external mobile terminal according to preset priorities, and transmitting the classified information to the first terminal according to the preset priorities.

21. The method of claim 13, further comprising periodically detecting, by the second terminal, a resource usage of the first terminal, using the resources of the first terminal based on the resource usage of the first terminal exceeding a preset reference, and transmitting, to the first terminal, result information in response to the use of the resources, or
periodically detecting, by the first terminal, a resource usage of the second terminal, using the resources of the second terminal based on the resource usage of the second terminal exceeding a preset reference, and transmitting, to the second terminal, result information in response to the use of the resources.

22. The method of claim 13, further comprising updating, by the second terminal, an application program of the first terminal by receiving, from a server or an external mobile terminal, data for updating the application program of the first terminal, and transmitting, to the first terminal, the received data.

23. The method of claim 13, further comprising outputting, by the first terminal and on a vehicle home screen, icons indicating the application programs included in the application program list, and
changing, by the second terminal, a graphic user interface theme corresponding to the vehicle home screen.

* * * * *